June 21, 1938.   K. D. LOOSE ET AL   2,121,128
BAKED ARTICLE
Filed Jan. 14, 1935   3 Sheets-Sheet 2
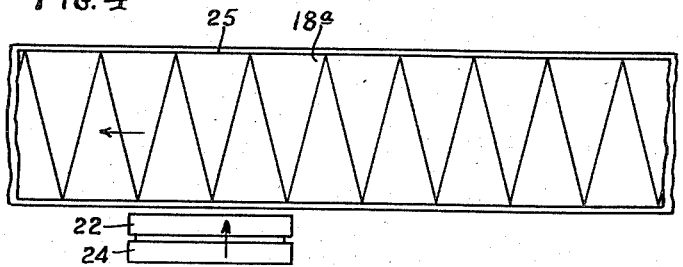
Fig. 4
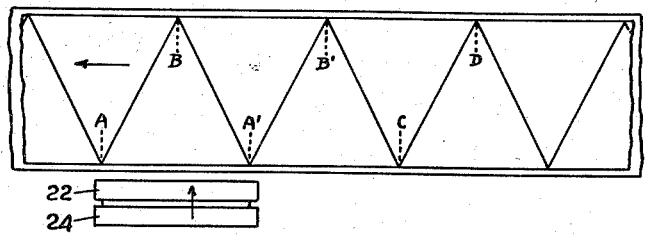
Fig. 5
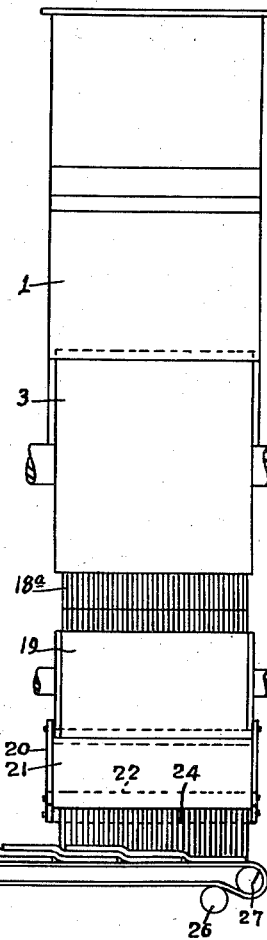
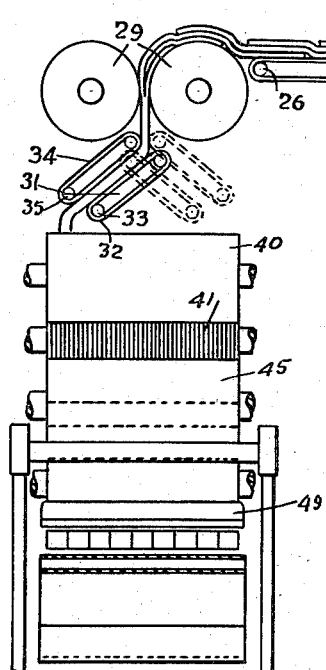
Fig. 3.
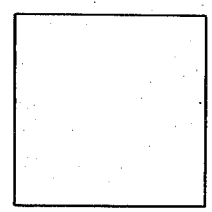
Fig. 6.
Fig. 7.
Inventors
KENNETH D. LOOSE,
CHARLES W. WATKINS,
JOSEPH W. GREEN,
By
Attorneys June 21, 1938.  K. D. LOOSE ET AL  2,121,128
BAKED ARTICLE
Filed Jan. 14, 1935  3 Sheets-Sheet 3

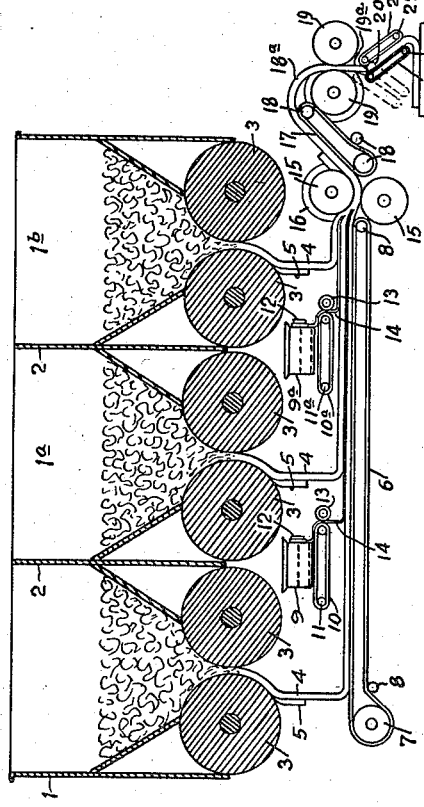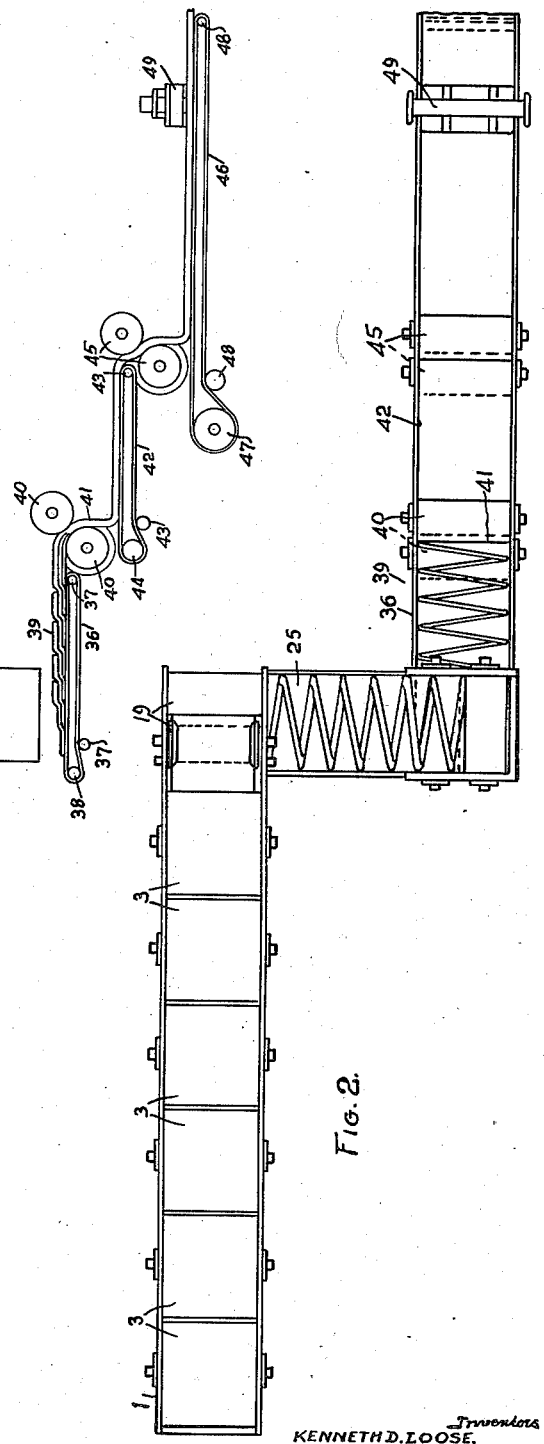

KENNETH D. LOOSE,
CHARLES W. WATKINS,
JOSEPH W. GREEN,
Inventors

Patented June 21, 1938

2,121,128

UNITED STATES PATENT OFFICE 2,121,128

BAKED ARTICLE

Kenneth D. Loose, Bronxville, N. Y., and Charles W. Watkins and Joseph W. Green, Dayton, Ohio, assignors to Loose-Wiles Biscuit Company, Long Island City, N. Y., a corporation of New York Application January 14, 1935, Serial No. 1,610 In Canada December 15, 1934

2 Claims. (Cl. 99—90)

This invention relates to the production of the bakery product known as crackers or biscuits and consists of two parts or branches, namely, a continuous method of manufacturing or producing the article, and the new article itself, thereby produced, of which the new article is herein claimed.

The general object in view is the production of a new character of biscuit or cracker, in the nature of a biscuit or cracker sandwich, the term "sandwich" being here used as descriptive of the character of the article, that is to say, the body of the biscuit or cracker is made of suitable dough, in this case treated in a certain manner, and a so-called sandwich ingredient which, though not separable from the body of the biscuit or cracker and though not necessarily visible, yet is present in the cracker, permeating it and giving it a certain crisp or semi-crisp and tender characteristic, and a light and airy condition, with the flavor of the permeating ingredient.

Referring for the purpose of illustration alone to the method branch of our invention, we would state that it consists essentially of the following steps:

Step one, making up the dough; step two, reducing the dough to a plurality of comparatively thin continuous sheets, adapted to be extended in length and made thinner as the method of treatment proceeds; step three, laminating the continuous sheets, each succeeding one upon the preceding one, with their points of union spaced apart to expose more or less of the preceding sheet; step four, applying to such exposed sheet portion any suitable edible ingredient, in quantities sufficient to give the product a palatable flavor or taste or in such quantities as assure such flavor or taste, the sandwich material as it were, being overlaid by the next succeeding dough sheet; step five, subjecting such laminated sheets of dough and said added ingredients to pressure to form them into a single relatively thin enriched sheet; step six, laying such thin enriched sheet in overlapping folds, each fold overlapping the preceding fold, whereby a further lamination takes place; step seven, supporting the dough sheet so treated upon a moving or traveling instrumentality during the step of so folding the sheet, the component of the traveling and overlapping motions of the sheet causing each fold to partly overlie the preceding fold along an oblique line, whereby an increased lamination is effected; step eight, reducing by pressure the thus overlapped layers to a single thin sheet which constitutes the complete stock in sheet form; step nine, and then severing such last-named sheet into portions or sections, each constituting in shape and size the desired cracker product.

This article constitutes the second branch of this invention, which comprises a new article of manufacture which is herein claimed and is formed of laminations of cracker or biscuit material, alternating with layers of edible and palatable ingredients, which latter introduce into the article its so-called sandwich character.

These and other advantages will appear from the following description taken in connection with the drawings, which disclose a preferred instrumentality for carrying out the method of producing the crackers.

Referring to the drawings:

Figure 1 is a longitudinal vertical section through a form of apparatus adapted to carry out applicants' method.

Figure 2 is a top plan view of the apparatus shown in Figure 1.

Figure 3 is an end elevation of the apparatus shown in Figures 1 and 2, looking at the right-hand end as shown in these figures.

Figures 4 and 5 are detail views showing the manner in which the sheet of dough is folded or lapped to produce therefrom another sheet of dough.

Figure 6 is a plan view of this cracker.

Figure 7 is a side elevation of the cracker or article of manufacture produced by this method.

Figure 8:
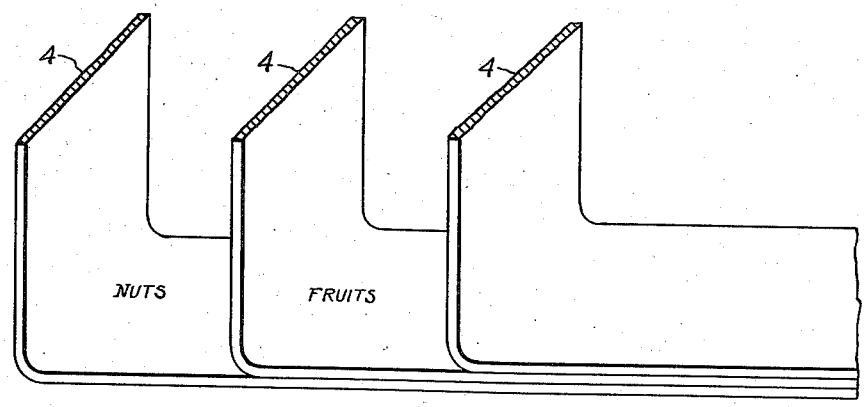
Figure 8 is a perspective view, somewhat enlarged, of the several layers of dough which are issued from the hoppers and rollers above, some of the flavoring ingredients being noted where they would be supplied by the hoppers shown in Figure 1 through the feed gate 12.
Figure 9:
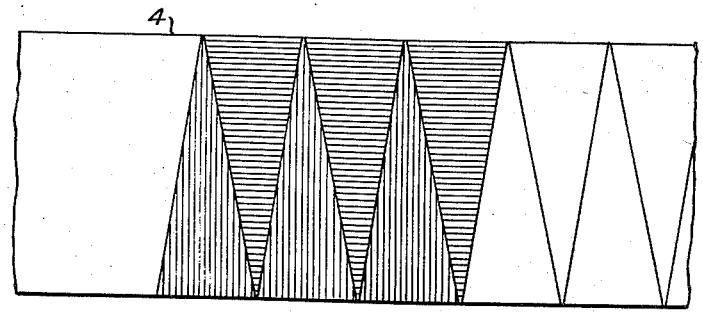
Figure 9 is a plan view of a section of the layers of dough with their oblique folds, the vertical lines on some of the oblique areas and the horizontal lines on some are merely applied to more clearly distinguish one area from another.

It will be seen from Figure 8, a perspective view, that the three layers of dough issued from the hoppers as seen in Figure 1 are laminated because each layer is placed on the upper side of the preceding layer. This is well shown in Figure 8. The words "nuts" and "fruits" are applied in Figure 8 to show the areas upon which the different flavoring ingredients are placed by the machine as shown in Figure 1. Of course, there may be as many hoppers 9 and feedgates 12 as may be desired, two being illustrated in Figure 1, and Figure 8 having the legends on but two areas.

This invention relates to an article of manufacture in the nature of a sandwich, cracker or biscuit, which may be produced by various methods of manufacture, one of which is disclosed and claimed in our prior Patent No. 1,975,326, granted October 2, 1934, and which, as described below, is merely one method by which the article may be produced and is therefore merely illustrative and in no wise limiting. The dough that has been prepared in the usual manner is placed in hoppers 1, 1a, and 1b, separated by removable division walls 2. In the present instance three hoppers are shown, separated from one another by means of these removable walls 2. Any number of hoppers may be used with or without the walls 2.

At the outlet from each hopper, for the purpose of delivering the dough therefrom in the form of a continuous sheet, are two rollers 3, rotating in opposite directions, for feeding the sheet 4, (which may be separated from any roller by means of a scraper or blade 5) onto a traveling conveyor composed of a belt 6 and rollers 7 and 8. The roller 7 is a driving roller and cooperates with two other rollers 8 in properly supporting the belt. The hoppers and the pairs of rollers associated therewith are so arranged that the sheets of dough are delivered onto the traveling conveyor belt at spaced points, as clearly shown in Figure 1.

In order to apply an edible sandwich material to the different sheets of dough, hoppers 9 and 9a are provided. The hopper 9 is located between the outlet from hopper 1 and the outlet from hopper 1a, while the hopper 9a is located between the outlet from hopper 1a and the outlet from hopper 1b. Associated with the hopper 9 is a conveyor belt 10, composed of canvas or wire cloth, supported on rollers 11, while a similar canvas belt 10a, used in connection with the hopper 9a, is supported on rollers 11a.

Located in one side of the hoppers 9 and 9a is a feed gate 12, which may be adjusted to regulate the delivery of the edible or sandwich material onto the conveyor. At the delivery end of each conveyor 10 and 10a is a spreading means such as a rotary brush 13 for distributing the edible or sandwich ingredient transversely across the sheet of dough as it moves along with the conveyor belt 6.

The edible or sandwich ingredient 14 may be composed of grains, cereals, nuts, fruits, pastes, creams, fats or other edible mastics.

The sandwich material is delivered by the conveyor 10 from the hopper 9, onto the sheet of dough. After this sandwich material has been delivered and distributed over the first sheet, a second sheet of dough is applied upon such sandwich material. Thereafter, a second layer of sandwich ingredient is distributed upon the second sheet, after which a third sheet of dough is applied upon the last layer of sandwich material and this process may be repeated as often as desired.

This composite sheet, composed of the several separate continuous sheets of dough and the intervening sandwich ingredient, is indicated by the numeral 14a, and may be of any desired thickness. This composite sheet is thereafter passed between two rollers 15, which reduce its thickness.

In order to prevent the spreading of the composite sheet of dough, one of the rollers has on each end a flange 16, projecting partly across the end of the other roller. Thus far the first formed sheets of dough have been formed into a composite sheet which has passed through a set of rollers by which its thickness has been reduced and its length has been increased without increasing the width of the sheet.

As the composite sheet of dough leaves the rollers 15 it is received by a conveyor belt 17, supported and driven by rollers 18. From this conveyor the now laminated or composite sheet 18a, which may be about one inch in thickness, passes between two rollers 19, wherein its thickness is further reduced and its length correspondingly increased without changing its width.

It will be noticed that there is a constant drawing out of the composite sheet. After the sheet has passed between the rollers 19, it passes between two conveyor members supported on an oscillating frame 20. The conveyor member consists of a conveyor belt 21 and a pair of rollers 22 for supporting this belt, and a second belt 23 supported by a pair of rollers 24.

This oscillating frame supports in spaced relationship to each other these conveyors so that as the sheet of dough is fed between the rollers 19 in a sheet 19a, this sheet passes between the two conveyors. This oscillating frame is supported at its upper end and operated to swing transversely of a lower conveyor belt 25.

As the frame 20 oscillates back and forth across the conveyor belt 25, the sheet of dough is deposited on the belt in transverse layers extending from one side of the belt to the other. The number of layers deposited one on the other depends upon the speed at which the conveyor belt 25 moves. The manner in which the oscillating frame delivers the sheet of dough to the conveyor belt 25 is illustrated in Figure 4, in which are shown the two lower rollers of the oscillating frame. Between these rollers 22 and 23 the sheet of dough passes, and as these rollers move from one side of the conveyor belt 25 to the other the sheet will be deposited in overlapping layers on the belt. If the belt is stationary the sheet will be deposited directly across the conveyor belt at right angles to the sides thereof, but should the conveyor belt be moving in the direction indicated by the arrow the sheet of dough will be disposed diagonally with respect to the belt.

Let it be assumed that the lower end of the oscillating arm with the rollers 22 and 23 thereon is in the position A—A', and the conveyor belt is moving with one-half the velocity that the lower end of the frame is swinging. Then as the frame swings from the position A—A', across the belt, the sheet will take the direction indicated by the line A—B, and after it has delivered the sheet of dough on top of the conveyor belt, it will be in the position B—B' with respect to the belt.

As the lower end of the oscillating frame moves back to its original position, it will move from the position B—B' to the position A'—C. After the lower end of the frame has assumed the position A'—C a second swinging of the oscillating frame across the conveyor belt will cause it to assume the position B'—D, with regard to the belt.

It will be observed that these oscillations take place with a sufficient degree of rapidity that a multiple ply of the sheet of dough is placed upon the conveyor belt. If the speed of the oscillating frame were increased, with relation to the speed of the conveyor belt, a larger number of plies of dough would be deposited on the belt. Any number of plies may be deposited one on top of the other.

The conveyor belt 25 is supported by means of a drive roller 27 and a pair of rollers 26. The sheet of dough formed in the manner herein described in connection with Figure 4 is indicated by the numeral 28, which includes as many plies of the material as received from the rollers 19. The sheet of material 28 is delivered by the conveyor 25 to a pair of rollers 29, which still further reduces the thickness of the strip.

From these two rollers the sheet of dough 30 is delivered to a pair of oscillating belts carried by an oscillating frame 31, similar to the oscillating frame 20. This frame has a belt 32 supported by rollers 33 and a second belt 34, supported parallel to the belt 32 by means of rollers 35. This frame is supported to oscillate across a belt conveyor 36 which receives the sheet as it passes between the belts 32 and 34. These belts are suitably driven, and the frame is caused to oscillate back and forth across the belt conveyor 36, to which the sheet is delivered in the same manner that the sheet was delivered to the belt 25.

The belt conveyor 36 is supported by a driving roller 38 and two other rollers 37. As this belt conveyor travels the material is delivered transversely thereof in layers or folds, indicated by the numeral 39. There may be any desired number of layers. The thickness of the resulting sheet depends upon the number of folds or laps.

This sheet is delivered by the conveyor 36 to a pair of rollers 40, similar to rollers 15, which reduce the thickness of the sheet of dough and increase its length. As the sheet passes from these two rollers as indicated by the numeral 41 it is received on a conveyor belt 42, supported by rollers 43 and a driving roller 44.

This sheet may be of various degrees of thickness, and is conveyed by means of the conveyor belt 42 to a pair of gauging rollers 45 where it is still further compressed.

From these rollers 45 (which are the gauging rollers of a biscuit cutting machine) this sheet of dough is directed to a conveyor belt 46, supported by means of a driven roller 47 and two other rollers 48, and the sheet having been reduced to the proper thickness is conveyed to the cutter for cutting the sheet into sections of proper size to constitute biscuits or crackers.

*Method branch*

The method branch of our invention comprises a series of steps or acts which deal with, and change the physical size, shape and condition of the dough from which the biscuit or cracker is made. We shall now enumerate the several steps, their relation to each other, their effect upon the raw material, and the preferred order in which the steps are performed. And it is to be observed, also, that two or more of the steps, aside from all of the steps, have a cooperating relation.

*Step 1*

Step 1 comprises the acts or work of making up the dough in one or more bulks. Such dough is made up in the usual way known in the biscuit or cracker-making art, and is appropriate in kind for cracker production.

*Step 2*

Step 2 comprises acts or operations which reduce the dough to a plurality of comparatively thin continuous sheets. These sheets are made thinner and extended in length, but not necessarily wider, as the method of treatment proceeds.

*Step 3*

Step 3 involves the laminating or overlaying of the several continuous sheets one upon the other, with the points of union spaced apart so as to expose more or less of the upper surface of the preceding sheet to make it available for the next step.

*Step 4*

Step 4 consists in applying to such exposed portions of each sheet, excepting the last sheet in any series, of any suitable edible as cereals, nuts, fruits, pastes, creams or other edible mastics, all to be applied in quantities sufficient to give the product a palatable flavor or taste or in such quantities as desired, and, in the case of shortening materials, to give the resulting biscuit or cracker a sufficiently tender, crisp and light quality. These several materials we class as sandwich material to distinguish the laminations which they comprise in the building up of the product. Each so-called sandwich coating or quantity is overlaid by the next succeeding sheet of dough.

*Step 5*

Step 5 comprises subjecting such laminated continuous sheets of dough and sandwich ingredients to pressure, preferably applied successively, one act of pressure after the other, as a means to form them into what is to become a single body of biscuit or cracker dough laminated with such flavoring or shortening ingredient.

*Step 6*

Step 6 involves laying such enriched laminated continuous sheets, now in the form of one sheet because of having been reduced to that, in overlying folds, each fold overlapping the preceding fold. Each fold, therefore, makes a further lamination of the now sheet of stock.

This step may be repeated. In the apparatus we describe and illustrate, we provide for such repetition of Step 6. Sometimes the repetition will be employed and sometimes not according to choice or other matters not affecting the scope of this invention.

*Step 7*

The 7th step involves supporting the dough sheet so treated upon a moving or traveling instrumentality during the step of so overlapping the sheet in a succession of folds. Thus the material is undergoing, in this 7th step, two movements, one a traveling movement and the other a substantially transverse movement, back and forth to cause an overlapping or folding of the sheet on itself. The component or result of such traveling or straightaway movement and such lateral movement results in causing each fold to partially overlie the preceding fold along an oblique line, which further laminates the now stock sheet of dough. Such motions also result in each folded section of the dough sheet overlapping in part the preceding lap and extending in part beyond the preceding lap. The angularity of the folds to the line of travel will depend upon the relative speed of the overlapping and traveling instrumentalities. These speeds and their relation to each other can be varied through a wide range of variation, so that no particular speeds or relative speeds are specially material. The essence of this step is that the now thin sheet of stock material or dough is further laminated in folds upon itself.

Step 8

Step 8 comprises reducing by pressure, or otherwise, the now overlaid layers from their overlapped bulk to a thinner state or sheet which will constitute the complete stock product in continuous sheet form.

Step 9

And finally, the 9th step is performed by severing such last-named sheet into portions or sections, each constituting in shape and size the desired biscuit or cracker product, now ready to be baked—a step not involved in our invention because the act of baking as generally employed will suffice in the case of this new product.

Article branch

This article constitutes the second branch of this invention, and comprises a new article of manufacture formed of continuous laminations or layers of said biscuit or cracker material or stock, with its interposed edible and palatable ingredients, the latter introducing into the article its so-called sandwich character. The cracker is flaky, is tender, is susceptible of having various flavors, according to which of the edible ingredients are used; and is capable of different degrees of tenderness. These qualities are noticeable, some of them by the mere breaking of the biscuit or cracker, and others by the sense of taste. This product or article, thus constructed, is a laminated mass when completed.

This article of manufacture, it will now be observed, comprises the use of a portion of the length of continuous strips of dough, folded obliquely to form laminated bodies, and elongated to thin down the laminated portions, so as to constitute, when baked, a succession of sandwich-like edibles, this composite structure containing flavoring ingredients.

It will also be noted that each and all of the strips of dough, after lamination, are continuous, whereby all the crackers or biscuits are uniform save as to the flavoring ingredients, which may be changed at the will of the maker.

Having thus fully described our invention, what we claim as new and desire to secure by Letters Patent is:

1. A new article of manufacture for the production of baked products consisting of an elongated thin strip of dough comprising a multiplicity of thin laminae of dough interleaved with thin laminae of enrichment material, said laminae being disposed in oblique folds relatively to said strip, the length of said strip being several times the width thereof.

2. A new article of manufacture for the production of baked products consisting of an elongated thin main strip of dough comprising a component strip disposed in oblique folds relatively to said main strip, said component strip comprising a multiplicity of thin laminae of dough interleaved with thin laminae of enrichment material, said laminae being disposed in oblique folds relatively to said component strip, the length of said main strip being several times the width thereof.

KENNETH D. LOOSE.
CHARLES W. WATKINS.
JOSEPH W. GREEN.